3,282,975
PROCESS FOR PRODUCING STABLE, UNDISTILLED TOLYLENE DIISOCYANATE COMPOSITIONS
Cecil A. Friedman, Buffalo, Bernard Taub, Williamsville, and Charles R. Wagner, Hamburg, N.Y., assignors to Allied Chemical Corporation, New York, N.Y., a corporation of New York
No Drawing. Filed July 8, 1963, Ser. No. 293,280
4 Claims. (Cl. 260—453)

This invention relates to improvements in the manufacture of stable, undistilled tolylene diisocyanate compositions obtained by phosgenation of tolylene diamines.

Tolylene diisocyanate is an important commercial product used in the manufacture of urethane polymers. As produced commercially it is derived from toluene by dinitration, reduction of the dinitro compounds to the corresponding diamines, phosgenation of the diamines with phosgene in the presence of a solvent and distillation of the phosgenation mixture to recover the toluene diisocyanates, usually a mixture containing 80% of the 2,4- and 20% of the 2,6-isomers. During the distillation of the mixture of reactive diisocyanates some decomposition and polymerization unavoidably occurs. The residue after distillation of the tolylene diisocyanate product represents a substantial loss of valuable product. Various attempts have been made to utilize this residue, which possesses isocyanate values, in the production of urethane polymer, but the highly viscous nature and widely divergent composition from batch to batch militates against such proposals. An attempt also has been made to recover diamines from this distillation residue but this has proven to be so costly as to be uneconomical.

It has been proposed also to utilize the undistilled phosgenation product which is obtained after removal of the solvent in which the phosgenation is carried out. Indeed, it has been fortuitously discovered that the essentially solvent-free undistilled phosgenation product has certain advantages over the distilled tolylene diisocyanates, notably this product can be utilized with polyfunctional polyols to prepare cellular urethanes by the "one-shot" procedure. Inasmuch as the usual preparation of the isocyanate terminated prepolymer can thusly be eliminated, the utilization of the undistilled phosgenation product has been a valuable contribution to technology of the preparation of urethanes.

We have observed, however, that the undistilled solvent-free tolylene diisocyanate compositions are not stable on storage, even in closed opaque containers. The precise reason for this instability is not known to us. The degree of instability is not constant. That is, to say, in some lots, the material changes in viscosity only several centipoises on standing for two months, while in other lots within the space of several weeks, the original fluid clear composition will have become quite viscous and contain considerable solid material. This stability does not appear to be associated with the manner in which the material as been prepared, for as indicated above, all undistilled tolylene diisocyanate (by which term we intend to designate the undistilled reaction product of a mixture of tolylene diamines with phosgene, which products may or may not contain a solvent and from which reaction products none or up to a major portion of the tolylene diisocyanate has been removed by distillation) is unstable to some extent.

Our investigation of this problem has lead us to the conclusion that in the instances wherein undistilled tolylene diisocyanate on storage deposits a solid material within about a two week period it can be characterized as containing a material, the infra-red spectrum of which possesses a well-defined absorbance maximum at 7.37 microns. Conversely, undistilled tolylene diisocyanate which does not possess a well defined absorbance maximum at 7.37 microns is relatively stable, i.e. it can be stored for several months without depositing a solid material.

It is, therefore, a principal object of the present invention to devise a process for the improvement of the stability of undistilled tolylene diisocyanate composition containing material possessing well-defined absorbance in the infra-red at 7.37 microns.

Another object is to devise a process for preparing undistilled tolylene diisocyanate compositions which are stable on storage for extended periods.

These and other objects will be obvious from the following description of our invention.

We have made the surprising discovery that the storage stability of undistilled tolylene diisocyanate compositions which contain material possessing well-defined absorbance in the infra-red at 7.37 microns can be improved by heating the unstable undistilled tolylene diisocyanate composition to a temperature above 100° C. but below the boiling temperature of the composition and adding phosgene to said composition until a sample of the reaction mixture, after removal of solvent and "degassing" is substantially devoid of material possessing a well-defined absorbance maximum at 7.37 microns. This treatment is expedited by carrying out the phosgenation under super-atmospheric pressure, e.g., about 45 to 55 p.s.i.g., and hence such a condition is to be preferred.

The treated undistilled tolylene diisocyanate composition which is substantially devoid of material possessing a well-defined absorbance maximum at 7.37 microns may then be heated to remove excess phosgene and other gaseous components, the solvent, if any, is removed, e.g., by distillation, and the solvent-freed material "degassed" by heating at an elevated temperature for a short period. The resulting residue is an undistilled tolylene diisocyanate composition which does not deposit a solid material on standing for extended periods. If desired the solution can be distilled removing diisocyanate to adjust the amine equivalent to within a desirable range.

The complicated series of reactions involved in our novel process is not fully understood. The following discussion is given for the purpose of assisting those skilled in this art to better understand the process and it should be distinctly understood that we are not to be bound in any manner by the details of this hypothesis.

In the manufacture of tolylene diisocyanates on a commercial scale, it is usual to employ technical mixtures of tolylene diamines obtained by the dinitration of toluene and reduction of the mixture of dinitrotoluenes. This mixture of diamines consists predominantly of 2,4-tolylene diamine, with a significant amount of 2,6-tolylene diamine and minor amounts, about 3 to 4%, of the 2,3 and/or 3,4 tolylene diamines. The latter components are undesirable since on phosgenation, it is known that the ortho diamines do not yield the corresponding tolylene diisocyanate but give rise to benzimidazolones, according to the following equation:

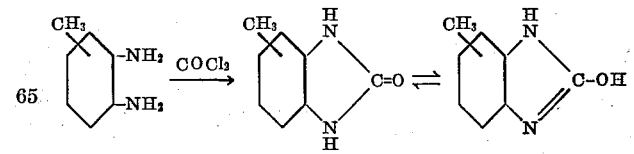

The benzimidazolones, which probably are present in equilibrium with the tautomeric 2-hydroxybenzimidazoles, contain two active hydrogens which are capable of reacting with isocyanate. It is probable that in the usual commercial process for preparing tolylene diisocyanate which involves a distillation of the tolylene diisocyanate from the phosgenation mixture, the benzimidazolone by-products and the higher molecular weight reaction products thereof constitute a significant portion of the distillation residue remaining after the removal of the desired tolylene diisocyanate. It is probable also that the undistilled tolylene diisocyanate product, i.e. the phosgenation reaction mixture from which the solvent but not the tolylene diisocyanate has been essentially removed also contains benzimidazolones and/or reaction products thereof. In certain instances, the undistilled tolylene diisocyanate product, on standing, deposits a solid material, which appears to be an adduct of tolylene diisocyanate and methylbenzimidazolone, the infra-red absorption spectrum of which contains a well defined band at 7.37 microns.

It is probable, further, that in some instances conditions during the phosgenation step are such that the benzimidazolone component(s) does not react with phosgene or diisocyanate and hence is present in the crude tolylene diisocyanate in a reactive form, which on standing is converted to an insoluble adduct. In other instances, the benzimidazolone component(s) does react with phosgene or diisocyanate to form soluble, relatively unreactive substances, which do not absorb at 7.37 microns, and hence do not precipitate out on standing.

The present invention makes possible the detection of those undistilled tolylene diisocyanate compositions which are unstable and the conversion of said unstable compositions to stable crude tolylene diisocyanate compositions.

The process of our invention can be effected over a broad range of temperature, from about 100° C. to the boiling temperature of the undistilled tolylene diisocyanate composition. Inasmuch as the process can, and is preferably, carried out in the presence of a solvent for the isocyanate the maximum temperature in the preferred instances will be the boiling point of the particular solvent or solvent mixture. Preferably the reaction is carried out between about 130° C. and about 180° C. Temperatures below 130° C., we have found, require progressively longer times for completion and in fact at below 100° C., the reaction velocity is so slow as to be highly undesirable. At above about 200° C., the side reactions in the highly reactive diisocyanate mixture become so prominent as to materially affect the yield of desired product and hence are to be avoided.

The process is preferably carried out under superatmospheric pressure. Pressure in this instance acts to increase the reaction velocity, presumably by confining the phosgene, and thus to permit shorter time cycles. At temperatures within the range of about 140° to 160° C., a pressure of about 40 to 60 p.s.i.g. results in a convenient process. As the pressure is increased, the temperature required to complete the process in a specific time, is generally decreased, and vice versa.

Although the process can be operated without solvent, the use of solvents normally used in the phosgenation process are to be preferred. The presence of solvent gives rise to more fluid mixtures which are more conveniently handled before, during and after phosgenation treatment. Suitable solvents are well known in this art and include toluene, xylenes, mono and dichlorobenzene and the like.

The following examples are illustrative of the process of our invention. Parts are by weight and temperatures are given in degrees centigrade.

*Example I*

A solution of 250 parts of undistilled tolylene diisocyanate product, obtained by the phosgenation of a mixture of about 78% 2,4-tolylenediamine, 18% 2,6-tolylene diamine and about 4% o-tolylene diamines in dichlorobenzene with phosgene, from which the acid gases had been removed and substantially all the solvent had been distilled in vacuo, and which possessed a strong infra-red absorption band at 7.37 microns, in 1600 parts of o-dichlorobenzene is heated to about 150°. During a period of about 3½ hours, 110 parts of phosgene is bubbled into the mixture under substantially atmospheric pressure. The resultant mixture when examined by infra-red shows no absorption peak at 7.37 microns. The solvent is then distilled from the mass, leaving an undistilled tolylene diisocyanate composition which can be stored for periods of two months without the deposition of solid.

The original untreated material on storage for one week or more deposits solid material, increases in viscosity and decreases in isocyanate titre.

*Example II*

The procedure of Example I above is repeated with the sole exception that no phosgene is added to the hot solution. After the reaction period the treated material still showed a strong absorption band at 7.37 microns. On being stored for 5 weeks in an amber bottle and at ambient temperature, solids amounting to about 4.5% by volume are formed in this undistilled tolylene diisocyanate product and the viscosity increased from about 25 to over about 50 centipoises.

*Example III*

A mixture of 1800 parts of undistilled tolylene diisocyanate product (stripped of solvent and showing a strong absorption at 7.37 microns in the infra-red), 1280 parts of phosgene and 10,150 parts of chlorobenzene is heated to and maintained at 160° and at 45 to 55 p.s.i.g. for one hour. The batch is cooled to 110° and the pressure is gradually released. The residual phosgene and gaseous by-products are removed along with some solvent by heating the mixture. Thereafter the solvent is distilled from the mass. The distillation is continued until the amine equivalent of the residual undistilled toluene diisocyanate composition is adjusted to within 106 to 108. (During this concentration the mixture is "degassed.") The residual of undistilled tolylene diisocyanate composition does not absorb infra-red radiation at 7.37 microns and it is stable, i.e., it remains clear and does not increase in viscosity, on being stored at ambient temperature for 4 to 5 weeks.

It can thus be seen that an effective and economical procedure for converting unstable crude tolylene diisocyanate mixtures to a more stable form has been devised.

Our invention has been illustrated by several detailed examples and various modifications have been alluded to in the specification. It is to be understood, however, that the invention is not to be limited to the details of the illustrative examples since modifications therein can be made without departing from the scope or spirit of our invention.

In this specification use has been made of the term "degassing." By this term we intend to refer to the conventional practice of heating the tolylene diisocyanate mixture after removal of solvent for a sufficient period and at a suitable temperature to decompose any carbamyl chloride or similar moieties and to drive off the resultant acidic gases from the mixture.

We claim:

1. A process for preparing stable, liquid undistilled tolylene diisocyanate compositions from unstable liquid undistilled tolylene diisocyanate compositions prepared by the phosgenation of tolylene diamine compositions containing material which possesses a well defined absorbance maximum of infra-red radiation at 7.37 microns and which on standing at ambient temperature deposit solid material which comprises heating said unstable composition to a temperature between 100° C. and the boiling point thereof and adding phosgene to the heated composition until the said mixture on removal of solvent by distillation and degassing is substantially devoid of material possessing a well defined absorbance maximum of infrared radiation at 7.37 microns.

2. A process as claimed in claim 1 wherein heating said unstable composition is conducted under superatmospheric pressure.

3. A process as claimed in claim 1 wherein heating is conducted at a temperature between about 130 to about 180° C.

4. A process as claimed in claim 1 wherein heating is conducted at a temperature within the range of about 140 to 160° C. under a pressure of about 40 to 60 p.s.i.g.

References Cited by the Examiner
UNITED STATES PATENTS

| 2,824,117 | 2/1958 | Gemassmer | 260—453 |
| 2,884,360 | 4/1959 | Bloom et al. | 260—453 X |
| 2,891,983 | 6/1959 | Bloom et al. | 260—453 |

CHARLES B. PARKER, *Primary Examiner.*

DALE R. MAHANAND, *Assistant Examiner.*